United States Patent
Hermanns

(10) Patent No.: US 9,461,325 B2
(45) Date of Patent: Oct. 4, 2016

(54) METHOD AND DEVICE FOR PERMANENTLY BONDING A POLYMER ELECTROLYTE MEMBRANE TO AT LEAST ONE GAS DIFFUSION ELECTRODE

(75) Inventor: Margarete Hermanns, Erlangen (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 1846 days.

(21) Appl. No.: 11/883,731

(22) PCT Filed: Feb. 1, 2006

(86) PCT No.: PCT/EP2006/050577
§ 371 (c)(1),
(2), (4) Date: Aug. 2, 2007

(87) PCT Pub. No.: WO2006/082195
PCT Pub. Date: Aug. 10, 2006

(65) Prior Publication Data
US 2008/0118784 A1    May 22, 2008

(30) Foreign Application Priority Data
Feb. 7, 2005  (EP) .................................... 05002510

(51) Int. Cl.
H01M 8/00 (2016.01)
H01M 8/10 (2016.01)
H01M 8/02 (2016.01)

(52) U.S. Cl.
CPC ......... *H01M 8/1004* (2013.01); *H01M 8/0273* (2013.01); *Y02E 60/521* (2013.01)

(58) Field of Classification Search
CPC ............ H01M 8/0273; H01M 8/1004; Y02E 60/521

USPC .......................... 429/400–535; 156/285, 382
See application file for complete search history.

(56) References Cited

U.S. PATENT DOCUMENTS 3,964,958 A * 6/1976 Johnston ........................ 156/382
4,691,857 A * 9/1987 Friedman ...................... 228/265

(Continued)

FOREIGN PATENT DOCUMENTS

FR       2 224 206       10/1974
JP       61239568 A      10/1986

(Continued)

OTHER PUBLICATIONS

E. A. Ticianelli, C. R. Derouin, A. Redondo and S. Srinivasan; "Methods to Advance Technology of Proton Exchange Membrane Fuel Cells"; Journal of the Electrochemical Society; Sep. 1988; pp. 2209-2214; vol. 135, Issue 9; Manchester, ISSN: 0013-4651; New Hampshire, US.

(Continued)

Primary Examiner — Muhammad Siddiquee
(74) Attorney, Agent, or Firm — Henry M. Feiereisen LLC

(57) ABSTRACT

The invention relates to a permanent connection of a polymer electrolyte membrane to at least one gas diffusion electrode, wherein it is possible to create a particularly long-lasting connection therebetween by pressing the membrane and gas diffusion electrode and exerting external pressure, also enabling a particularly high degree of proton conductivity to be obtained between the membrane and the at least one electrode. In order to create the pressing movement, the pressure of a fluid is increased. The fluid enters into contact with the membrane and/or gas diffusion electrode(s) in a direct manner or via an elastic intermediate element.

10 Claims, 3 Drawing Sheets

(56) References Cited

U.S. PATENT DOCUMENTS

| | | | |
|---|---|---|---|
| 5,534,362 A | 7/1996 | Okamoto et al. | |
| 6,200,698 B1 | 3/2001 | Carlstrom, Jr. | |
| 2003/0059661 A1 | 3/2003 | Gorbell et al. | |
| 2003/0075259 A1* | 4/2003 | Graham | 156/94 |
| 2003/0186109 A1* | 10/2003 | Huang et al. | 429/44 |
| 2006/0078781 A1* | 4/2006 | Stegink et al. | 429/35 |

FOREIGN PATENT DOCUMENTS

| | | |
|---|---|---|
| JP | 03084866 A | 4/1991 |
| JP | 03208262 A | 9/1991 |
| JP | 2005268023 A | 9/2005 |
| JP | 2006120519 A | 5/2006 |

OTHER PUBLICATIONS

Communication from Japanese Patent Office with English translation, Sep. 6, 2011, pp. 1-6.

* cited by examiner

METHOD AND DEVICE FOR PERMANENTLY BONDING A POLYMER ELECTROLYTE MEMBRANE TO AT LEAST ONE GAS DIFFUSION ELECTRODE

CROSS REFERENCE TO RELATED APPLICATIONS

This application is the US National Stage of International Application No. PCT/EP2006/050577, filed Feb. 1, 2006 and claims the benefit thereof. The International Application claims the benefits of European application No. 05002510.5 filed Feb. 7, 2005, both of the applications are incorporated by reference herein in their entirety.

FIELD OF INVENTION

The invention relates to a method for permanently bonding a polymer electrolyte membrane to at least one gas diffusion electrode. Such a bonding method is known e.g. from the article "Methods to Advance Technology of Proton Exchange Membrane Fuel Cells", E. A. Ticianelli et al, J. Electrochemical Society, Vol. 135 (1988) p. 2209. The invention further relates to a device for carrying out the method and a membrane electrode assembly produced according to the method.

BACKGROUND OF THE INVENTION

Low-temperature fuel cells based on polymer electrolyte membrane (PEM) technology are being discussed as environmentally friendly and efficient energy converters for portable, mobile and stationary applications and are already being used commercially for the first time. They convert hydrogen and oxygen into electrical direct current at temperatures ranging from just above freezing point to approximately 90° C., yielding water as the only by-product.

At the heart of a PEM fuel cell is a membrane electrode assembly (MEA) comprising a polymer electrolyte membrane with a gas diffusion electrode on either side and an electrocatalyst layer (e.g. of platinum) disposed therebetween. The gas diffusion electrodes typically consist of a solid, gas-permeable and electrically conductive substrate material (e.g. carbon fabric or paper).

A good permanent bond must exist between the membrane and the gas diffusion electrodes in order to achieve good proton conductivity. This bond has hitherto been established mainly by compressing the membrane and the electrodes at temperatures in excess of 100° C. in a hot press. Such a method is known e.g. from the above mentioned article.

The two electrodes can be simultaneously bonded to the membrane in a single pressing operation. Alternatively a first electrode can also be bonded to a first side of the membrane in a first pressing operation and then a second electrode can be bonded to another, opposite side of the membrane in a second pressing operation. This produces a permanent bond, i.e. even after removal of the pressing pressure and the pressing temperature which may be present, the bond remains intact throughout the lifetime of the membrane electrode assembly.

The common feature of these methods is that the membrane and the at least one electrode are pressed together by the pressing together of two plates of a press which are in direct contact with the electrode(s) and the membrane.

The attendant problem is that these plates often cannot be aligned exactly parallel, resulting in an inhomogeneous application of pressure to the membrane and the electrode(s), i.e. different pressing pressures along the surface of the membrane and electrode(s), and therefore inhomogeneous compression of these components. The same effect occurs in the event of unevennesses in the plate material, membrane or gas diffusion electrodes. This effect results in displacements of the materials in the press, uneven contact pressure and therefore uneven bonding between the electrodes and the membrane or even warping or destruction of the membrane and electrode material when the pressing pressure is removed. This significantly reduces the proton conductivity between the membrane and the electrodes.

SUMMARY OF INVENTION

The object of the invention is to specify a method and a device for carrying out said method whereby the above-mentioned problems can be avoided.

This object is achieved in respect of the method by the teaching of the claims. A device suitable for carrying out the method is the subject matter of the claims. A membrane electrode assembly produced using the method according to the invention is the subject matter of the claims. A particularly advantageous use of said membrane electrode assembly is the subject matter of the claims.

With the method according to the invention, the pressing movement for permanently bonding the membrane and the electrodes is not generated by pressing together two plates of a press which are in direct contact with the gas diffusion electrode and the membrane or the two gas diffusion electrodes, but by the pressure increase of a fluid which is in contact with the membrane and/or the at least one electrode either directly or via an elastic intermediate element.

In fluids, i.e. in gases and liquids, pressure propagates uniformly in all directions. Therefore, the same pressure acts on the membrane and the at least one electrode across the entire surface at which the fluid is in contact with the membrane or the electrode(s) either directly or via an elastic intermediate element, so that an even pressing movement is generated over this entire surface. This can produce a very homogeneous permanent bond between the membrane and the electrode(s) and therefore good proton conductivity between these elements.

The elastic intermediate element enables any ingress of fluid into the electrode(s) and/or membrane to be prevented, it being particularly advantageous if the elastic intermediate element is soft enough to enable it to mold to major unevennesses in the membrane or electrode under the effect of pressure. The elastic intermediate element therefore preferably has a Shore hardness A in the range 50 to 70, preferably 60, it being within the scope of the invention that the elastic intermediate element can also be made of a plurality of individual elements which can also consist of different materials. This enables the intermediate element to be matched e.g. to the fluid and/or electrolytes used and therefore allows the sealing characteristics and durability of the intermediate element to be optimized.

A particularly good permanent bond between the membrane and the at least one gas diffusion electrode can be created by additionally heating the polymer electrolyte membrane and the at least one gas diffusion electrode for bonding them together.

According to a particularly advantageous embodiment of the invention, heat is applied to the membrane and the electrode(s) via the fluid. As heat can spread very evenly in a fluid, in particular in a gas, a uniform temperature distribution can be achieved over the surfaces of the membrane and electrode(s), thereby enabling the homogeneity of the bond to be further improved. Heating can take place immediately prior to the actual pressing operation or even during pressing.

According to an advantageous embodiment of the method according to the invention, the pressing together of the membrane and the at least one gas diffusion electrode takes place in a fluid-filled chamber, the quantity of fluid in the chamber being increased to elevate the fluid pressure.

Additionally or alternatively, the chamber volume can be reduced to elevate the fluid pressure.

Additionally or alternatively, the temperature of the fluid in the chamber can likewise be increased to elevate the fluid pressure.

A device according to the invention for carrying out the method comprises a chamber in which a membrane with at least one adjacent electrode can be disposed and which can be filled with a fluid in such a way that the fluid is in contact with the membrane and/or the at least one adjacent electrode either directly or via an elastic intermediate element, it being possible to increase the pressure of the fluid in the chamber in order to press together the membrane and the at least one electrode.

BRIEF DESCRIPTION OF THE DRAWINGS

The invention and further advantageous embodiments of the invention as set forth in the features of the sub-claims will now be explained in greater detail with reference to exemplary embodiments illustrated in the accompanying drawings.

Corresponding parts are provided with the same reference numerals in each case in the drawings in which.

DETAILED DESCRIPTION OF INVENTION

Figure 1:
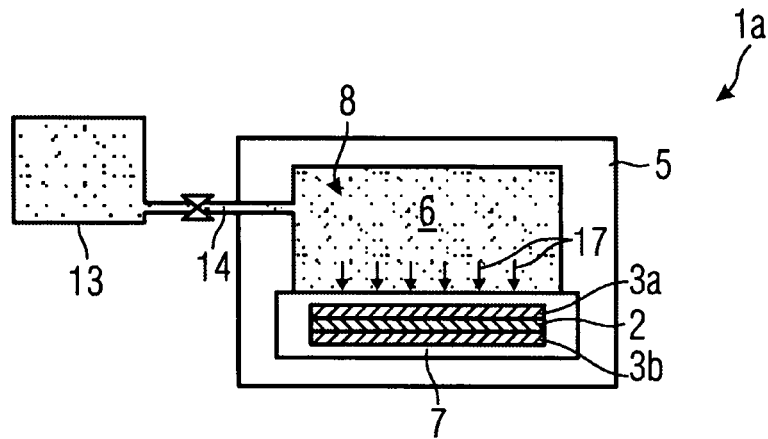
FIG. 1 shows a block diagram of a first embodiment of a device according to the invention.

FIG. 1 shows a block diagram of a first embodiment of an inventive device 1a for bonding a polymer electrolyte membrane 2 to bilaterally adjacent gas diffusion electrodes 3a, 3b. The device 1a comprises a pressure vessel 5 with an inner chamber 6 enclosed in a fluid-tight manner in which the membrane 2 with the adjacent electrodes 3a, 3b and an elastic intermediate element 7 enclosing the membrane and the electrodes 3a, 3b can be disposed. The inner chamber 6 can be filled with a fluid 8 such as air in such a way that the fluid 8 is in contact with the gas diffusion electrode 3a via the elastic intermediate element 7. The intermediate element 7 is fluid-tight and therefore prevents ingress of the fluid 8 into the electrodes 3a, 3b and the membrane 2.

The membrane 2 is bonded to the electrodes 3a, 3b by pressing the membrane 2 and the electrodes 3a, 3b together, it being possible to increase the pressure of the fluid 8 in the inner chamber 6 to produce the pressing movement. This pressure increase is effected by increasing the quantity of fluid 8 in the inner chamber 6, for which purpose additional fluid can be fed into the inner chamber 6 from a storage tank 13 via a supply line 14.

In the fluid 8, the pressure propagates uniformly in all directions. The same pressure is therefore exerted across the entire surface of the electrode 3a, so that the same pressing force 17 and therefore a uniform pressing movement is produced over this entire surface to bond the membrane 2 and the electrodes 3a, 3.

Figure 2:
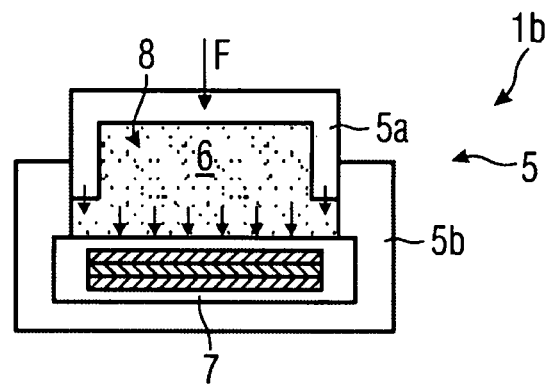
FIG. 2 shows a block diagram of a second embodiment of a device according to the invention.

In a second embodiment, denoted by 1b in FIG. 2, of a device according to the invention, to increase the pressure the volume of the inner chamber 6 can be reduced while the quantity of fluid in the inner chamber 6 remains constant. The pressure vessel 7 here consists e.g. of a stationary part 5b accommodating the membrane 2 and the electrodes 3a, 3b and a part 5a that is movable relative to the stationary part 5b. The movable part 5a can be pressed into the stationary part 5b under the effect of a force F, thereby reducing the volume of the inner chamber 6.

Figure 3:
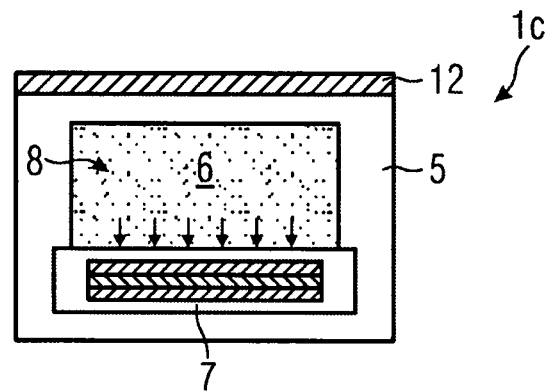
FIG. 3 shows a block diagram of a third embodiment of a device according to the invention.

In a third embodiment, denoted by 1c in FIG. 3, of a device according to the invention, to increase the pressure, the temperature of the fluid in the inner chamber 6 can be increased while the volume of the inner chamber 6 and the quantity of fluid in the inner chamber 6 remain constant. For this purpose the device has a plate-shaped heater 12 by means of which the inner chamber 6 and therefore also the fluid 8 can be heated up to a required temperature.

Figure 4:
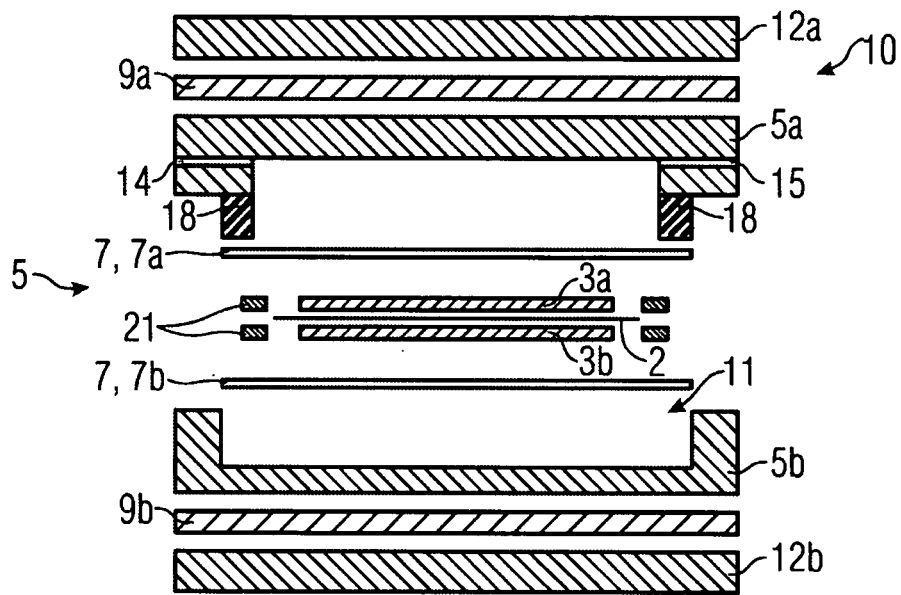
FIG. 4 shows an exploded view of a particularly advantageous device according to the invention.

FIG. 4 shows an exploded view of a particularly advantageous embodiment, denoted by 10, of a device according to the invention. The device 10 has a pressure vessel 5 formed by plates 5a and 5b disposed essentially parallel to one another which, when placed one on top of the other (see FIG. 5), create an inner chamber with a receptacle 11 for the membrane 2 and the bilaterally adjacent electrodes 3a, 3b. The plate 5a has sealing elements 18 on its contact surfaces with the plate 5b to provide sealing. Compressed air which is easy and inexpensive to produce, and is storable, is used as the fluid. The plate 5a has a supply line 14 for feeding the compressed air into the inner chamber 6 and a discharge line 15 for removing the compressed air from the inner chamber 6.

Figure 5:
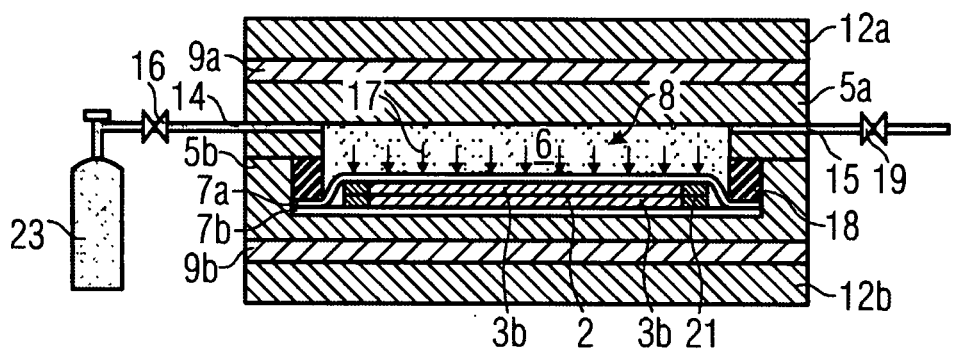
FIG. 5 shows the device in FIG. 4 during execution of the method according to the invention.

FIG. 5 shows the device 10 from FIG. 4 in the assembled state for carrying out the method according to the invention. Being completely enclosed by an elastic intermediate element 7, the membrane 2 and bilaterally adjacent electrodes 3a, 3b can be disposed in the inner chamber 6 in such a way that the compressed air 8 contacts the electrodes 3a via the intermediate element 7. The elastic intermediate element 7, consisting of two silicone plates 7a, 7b, is designed to prevent the ingress of compressed air into the electrodes 3a, 3b and the membrane 2 and is therefore air-tight. The silicone plate 7a contacts the electrode 3a and the silicone plate 7b contacts the electrode 3b, the silicone plates 7a, 7b slightly overhanging the electrodes 3a, 3b at their respective edges. The electrodes 3a, 3b are enclosed by a Teflon frame of the same thickness as the electrodes which is designed to prevent lateral deformation of the membrane 2 under the effect of pressure and heat.

For heating of the inner chamber 6 of the pressure vessel 7 the device 10 has a heater 9 comprising two heating plates 9a, 9b. An upper heating plate 9a is in thermal contact with the upper plate 5a of the pressure vessel 5 and a lower heating plate 9b is in thermal contact with the lower plate 5b of the pressure vessel 5.

The device 10 additionally has a pressing apparatus, only suggested in the illustration, for pressing together the two plates 5a, 5b for gas-tight sealing of the inner chamber 6.

The pressing apparatus has an upper pressing plate 12a adjacent to the upper heating plate 9a and a lower pressing plate 12b adjacent to the lower heating plate 9b.

Figure 6:
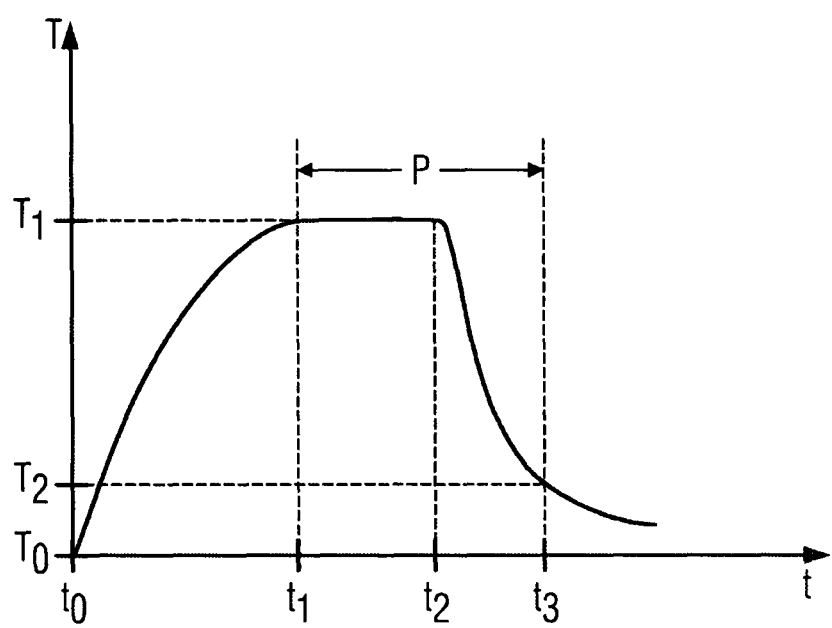
FIG. 6 shows a diagram of temperature/pressure versus time for a particularly advantageous method sequence.

As shown in FIG. 6, to produce a permanent bond between the electrodes 3a, 3b and the membrane 2, in a first step—initially without membrane and electrodes in the inner chamber 6—the two plates 5a and 5b of the pressure vessel 5 are closed by pressing together the pressing plates 12a and 12b and the inner chamber 6 is heated from a starting temperature T0 at a time t0 to a predefined bonding temperature T1 with the aid of the heating plates 9a and 9b. When the bonding temperature T1 is reached at time t1, the pressure vessel 5 is opened and—as shown in FIG. 5—the membrane 2 with bilaterally adjacent electrode 3a or 3b and adjacent silicone plate 7a or 7b is inserted in the receptacle 11 of the inner chamber 6. Then with the aid of the pressing plates 12a and 12b the two plates 5a and 5b of the pressure vessel 5 are pressed onto one another, thereby sealing the inner chamber 6 in an air-tight manner, the seals 18 forcing the silicone plates 7a and 7b against one another in their periphery in such a way that they form an air-tight envelope around the membrane 2 and the electrodes 3a, 3b. Due to the heating of the air already present in the inner chamber 6, the pressure of the air in the inner chamber 6 is already slightly elevated.

In the next step, opening of the valve 16 causes compressed air to be fed out of the compressed air reservoir 23 via the supply line 14 into the inner chamber 6 and therefore the pressure of the air in the inner chamber 6 to be increased to a predefined bonding pressure P. The bonding pressure P propagates uniformly throughout the inner chamber 6 so that the pressing force 17 is applied evenly over the entire surface of the electrode 3a to the membrane 2 and the electrode 3b. The pressure increase in the inner chamber 6 therefore produces a homogeneous pressing movement by means of which the electrodes 3a, 3b and the membrane 2 are pressed together in a homogeneous manner.

The compressed air 8 is heated by the heated plates 5a, 5b and transfers the heat in turn to the membrane 2 and the electrodes 3a, 3b. Due to the heat transfer via the compressed air 8, an even temperature distribution over the surface of the electrode 3a is possible.

Because of the homogenous pressure and temperature effect, particularly homogeneous bonding of the membrane 2 to the adjacent electrodes 3a, 3b is possible.

During the application of the bonding pressure P up to time t3, the temperature is initially maintained constant at the bonding temperature T1 for a predefined period up to time t2 and then cooling is initiated by removing the heat supply. After cooling of the pressure vessel 5 to a predefined end temperature T2 at time t3, the compressed air 8 is discharged from the inner chamber 6 via the discharge line 15 by opening the valve 19, thereby terminating the application of pressure. The pressure vessel 5 can then be opened and the new bonded membrane electrode assembly, i.e. the membrane 2 and the electrodes 3a, 3b bonded thereto, can be removed from the inner chamber 6. The membrane 3 is now permanently, i.e. for the entire lifetime of the membrane electrode assembly, and inseparably bonded to the electrodes 3a, 3b.

Using commercially available membranes (such as Nafion® N-115 manufactured by DuPont or comparable membranes) a particularly good bond between the membrane and two adjacent electrodes was able to be achieved with T1=175 to 195° C. and P=16 to 23 bar, in particular P=18 to 21 bar.

The invention claimed is:

1. A method for permanently bonding a polymer electrolyte membrane to a gas diffusion electrode, comprising:
    enclosing the gas diffusion electrode by a frame of a same thickness as the gas diffusion element to prevent lateral deformation of the electrolyte membrane under effects of pressure and heat;
    disposing the membrane and the gas diffusion electrode within a sealed pressure chamber;
    within the sealed pressure chamber forming an air tight envelope comprising a fluid impermeable elastic intermediate element composed of one or several individual elements of a same material;
    arranging the intermediate element about the membrane and the gas diffusion electrode so as to completely enclose the membrane and the gas diffusion electrode;
    within the sealed pressure chamber, placing a fluid in contact with the membrane or the gas diffusion electrode, wherein the fluid contacts the membrane or the electrode via the elastic intermediate element; and
    increasing the pressure of the fluid to press the membrane and the gas diffusion electrode together within the sealed pressure chamber.

2. The method as claimed in claim 1, wherein the membrane and the gas diffusion electrode are heated via the fluid to provide permanent bonding.

3. The method as claimed in claim 2, wherein a quantity of the fluid in the chamber is increased to increase the pressure of the fluid.

4. The method as claimed in claim 2, wherein a volume of the chamber is reduced to increase the pressure of the fluid.

5. The method as claimed in claim 2, wherein a temperature of the fluid in the chamber is increased to increase the pressure of the fluid.

6. The method as claimed in claim 1, wherein the elastic intermediate element is made of silicone.

7. The method as claimed in claim 6, wherein the elastic intermediate element has a Shore hardness A between 50 to 70.

8. The method as claimed in claim 7, wherein the fluid is compressed air.

9. A method for permanently bonding a polymer electrolyte membrane to at least one gas diffusion electrode, comprising:
    enclosing the gas diffusion electrode by a frame of a same thickness as the gas diffusion element to prevent lateral deformation of the electrolyte membrane under effects of pressure and heat;
    heating a fluid within a sealed pressure chamber to a predetermined temperature;
    within the sealed pressure chamber, disposing the membrane and the at least one electrode between two silicone plates such that ends of the silicone plates overhang the membrane; and
    within the sealed pressure chamber, forming a sealed envelope comprising a fluid impermeable elastic intermediate element composed of the silicone plates arranged about the membrane and the at least one electrode so as to completely enclose the membrane and the gas diffusion electrode; and
    increasing a pressure within the sealed pressure chamber to a predetermined pressure to press the membrane and the at least one electrode together within the sealed pressure chamber.

10. The method of claim 9, wherein the predetermined temperature is from 175° C. to 195° C., and wherein the predetermined pressure is from 16 to 23 bar.

* * * * *